(12) United States Patent
Nakagawa

(10) Patent No.: US 10,642,115 B2
(45) Date of Patent: May 5, 2020

(54) LIQUID CRYSTAL DISPLAY DEVICE

(71) Applicant: Panasonic Liquid Crystal Display Co., Ltd., Himeji-shi, Hyogo (JP)

(72) Inventor: Teruhisa Nakagawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 18 days.

(21) Appl. No.: 15/942,021

(22) Filed: Mar. 30, 2018

(65) Prior Publication Data
US 2019/0302549 A1    Oct. 3, 2019

(51) Int. Cl.
| | | |
|---|---|---|
| *G02F 1/1362* | (2006.01) | |
| *G02F 1/1343* | (2006.01) | |
| *G02F 1/1335* | (2006.01) | |
| *G02F 1/1368* | (2006.01) | |
| *G02F 1/1337* | (2006.01) | |

(52) U.S. Cl.
CPC .. *G02F 1/136209* (2013.01); *G02F 1/133512* (2013.01); *G02F 1/134336* (2013.01); *G02F 1/134363* (2013.01); *G02F 1/136286* (2013.01); *G02F 1/1368* (2013.01); *G02F 1/133514* (2013.01); *G02F 1/133723* (2013.01); *G02F 2001/133519* (2013.01); *G02F 2001/134372* (2013.01); *G02F 2201/122* (2013.01); *G02F 2201/123* (2013.01)

(58) Field of Classification Search
CPC ......... G02F 1/136209; G02F 1/133512; G02F 1/134336; G02F 1/134363; G02F 1/136286; G02F 1/133514; G02F 1/133723; G02F 1/1368; G02F 2001/133519; G02F 2001/134372; G02F 2201/122; G02F 2201/123
See application file for complete search history.

(56) References Cited

U.S. PATENT DOCUMENTS

| | | | |
|---|---|---|---|
| 2004/0183977 A1* | 9/2004 | Kitagawa | G02F 1/134363 349/141 |
| 2006/0001814 A1* | 1/2006 | Paik | G02F 1/136209 349/141 |
| 2007/0216832 A1* | 9/2007 | Takahashi | G02F 1/133516 349/106 |
| 2008/0074602 A1 | 3/2008 | Arai et al. | |
| 2008/0204616 A1* | 8/2008 | Fujita | G02F 1/136213 349/39 |

(Continued)

Primary Examiner — Hoan C Nguyen
(74) Attorney, Agent, or Firm — Hamre, Schumann, Mueller & Larson, P.C.

(57) ABSTRACT

Examples of liquid crystal display devices are described herein. In an example, a liquid crystal display device comprises a first substrate, a second substrate, and a liquid crystal layer therebetween. The second substrate comprises a plurality of source lines, a plurality of gate lines crossing the plurality of source lines, and a plurality of pixels in a matrix arrangement. A pixel from the plurality of pixels being defined by two adjacent source lines and two adjacent gate lines. A pixel electrode formed in the pixel comprises a plurality of slits. The plurality of slits includes a first set of slit segments extending in a first direction, and a second set of slit segments extending in a second direction. Further, a first light blocking member extends along a common boundary area of the first set of slit segments and the second set of slit segments.

21 Claims, 17 Drawing Sheets

(56) References Cited

U.S. PATENT DOCUMENTS

| | | | |
|---|---|---|---|
| 2010/0157222 A1 | 6/2010 | Arai et al. | |
| 2012/0146889 A1* | 6/2012 | Kwak | G02F 1/13394 345/88 |
| 2012/0176563 A1* | 7/2012 | Adachi | G02F 1/133536 349/62 |
| 2013/0286314 A1* | 10/2013 | Yoshida | G02F 1/136227 349/43 |
| 2015/0355516 A1* | 12/2015 | Imai | G02F 1/136227 349/123 |
| 2017/0242295 A1* | 8/2017 | Hirosawa | G02F 1/133345 |

* cited by examiner

LIQUID CRYSTAL DISPLAY DEVICE

TECHNICAL FIELD

The present subject matter relates to liquid crystal display devices.

BACKGROUND

Liquid crystal display (LCD) devices are commonly used as display devices, owing to their low power consumption and high-quality images. LCD devices are used in a variety of electronic devices, such as televisions, laptops, monitors for desktops, tablets, smartphones, personal digital assistants, and cameras.

An LCD device includes a layer with liquid crystal molecules. Displaying of content from the LCD device is controlled by controlling the orientation of the long axes of the liquid crystal molecules using an electric field. The orientation of the long axes of the liquid crystal molecules controls the transmittance of light through the layer of liquid crystal molecules.

SUMMARY

According to an example implementation of the present subject matter, a liquid crystal display device comprises a first substrate including a black matrix, a second substrate opposite to the first substrate, and a liquid crystal layer between the first substrate and the second substrate. The second substrate comprises a plurality of source lines, a plurality of gate lines crossing the plurality of source lines and a plurality of pixels in a matrix arrangement. A pixel from the plurality of pixels is defined by two adjacent source lines from the plurality of source lines and two adjacent gate lines from the plurality of gate lines. A pixel electrode formed in the pixel comprises a plurality of slits. The plurality of slits includes a first set of slit segments extending in a first direction, and a second set of slit segments extending in a second direction. The second substrate also comprises a first light blocking member for blocking light through the pixel. The first light blocking member extends along a common boundary area of the first set of slit segments and the second set of slit segments.

In an example implementation, the plurality of slits further includes a third set of slit segments extending in a third direction and a fourth set of slit segments extending in a fourth direction. The third set of slit segments and the fourth set of slit segments are formed in the common boundary area. The first set of slit segments and the second set of slit segments are connected through the third set of slit segments and the fourth set of slit segments. Further, in an example implementation, the first light blocking member entirely overlaps the third set of slit segments and the fourth set of slit segments in plan view.

In an example implementation, the first light blocking member is made of a metal.

In an example implementation, the second substrate further comprises a common electrode opposite to the pixel electrode, and a plurality of common metal lines electrically connecting to the common electrode. The first light blocking member is a part of the plurality of common metal lines.

In an example implementation, the plurality of source lines and the first light blocking member are formed in a same layer. In an example implementation, the first light blocking member is connected with one of the two adjacent source lines and is electrically isolated from the other of the two adjacent source lines. In an example implementation, the first light blocking member is electrically isolated from the two adjacent source lines.

In an example implementation, the second substrate comprises a second light blocking member for blocking light through the pixel. The second light blocking member overlaps edge portions of the plurality of slits, and is made of a metal. In an example implementation, the edge portions of the plurality of slits extend in a fifth direction different from the first direction and the second direction.

In an example implementation, the second substrate comprises a common electrode opposite to the pixel electrode, and a plurality of common metal lines electrically connecting to the common electrode. The plurality of common metal lines and the second light blocking member are formed in a same layer.

In an example implementation, the plurality of source lines and the second light blocking member are formed in a same layer.

In an example implementation, the plurality of gate lines is integrated with the second light blocking member. In an example implementation, at least a part of the second light blocking member is exposed from the black matrix in plan view.

In another example implementation of the present subject matter, a liquid crystal display device comprises a first substrate including a black matrix, a second substrate opposite to the first substrate, and a liquid crystal layer between the first substrate and the second substrate. The second substrate comprises a plurality of source lines, a plurality of gate lines crossing the plurality of source lines, and a plurality of pixels in a matrix arrangement. A pixel from the plurality of pixels is defined by two adjacent source lines from the plurality of source lines and two adjacent gate lines from the plurality of gate lines. A pixel electrode formed in the pixel comprises a plurality of slits. The second substrate also comprises a slit-edge light blocking member overlapping an edge portion of each of the plurality of slits in plan view. The slit-edge light blocking member is made of a metal. In an example implementation, each of the plurality of slits includes a main portion, the main portion continuously connecting with the edge portion. The main portion extends in a direction different from an extending direction of the edge portion in each of the plurality of slits.

In an example implementation, the second substrate comprises a common electrode opposite to the pixel electrode, and a plurality of common metal lines electrically connecting to the common electrode. The plurality of common metal lines and the slit-edge light blocking member are formed in a same layer.

In an example implementation, the plurality of source lines and the slit-edge light blocking member are formed in a same layer.

In an example implementation, the plurality of gate lines and the slit-edge light blocking member are formed in a same layer, with the slit-edge light blocking member being integrated with one of the plurality of gate lines. In an example implementation, at least a part of the slit-edge light blocking member is exposed from the black matrix in plan view.

BRIEF DESCRIPTION OF FIGURES

The following detailed description references the drawings, wherein.

DETAILED DESCRIPTION

Figure 1:
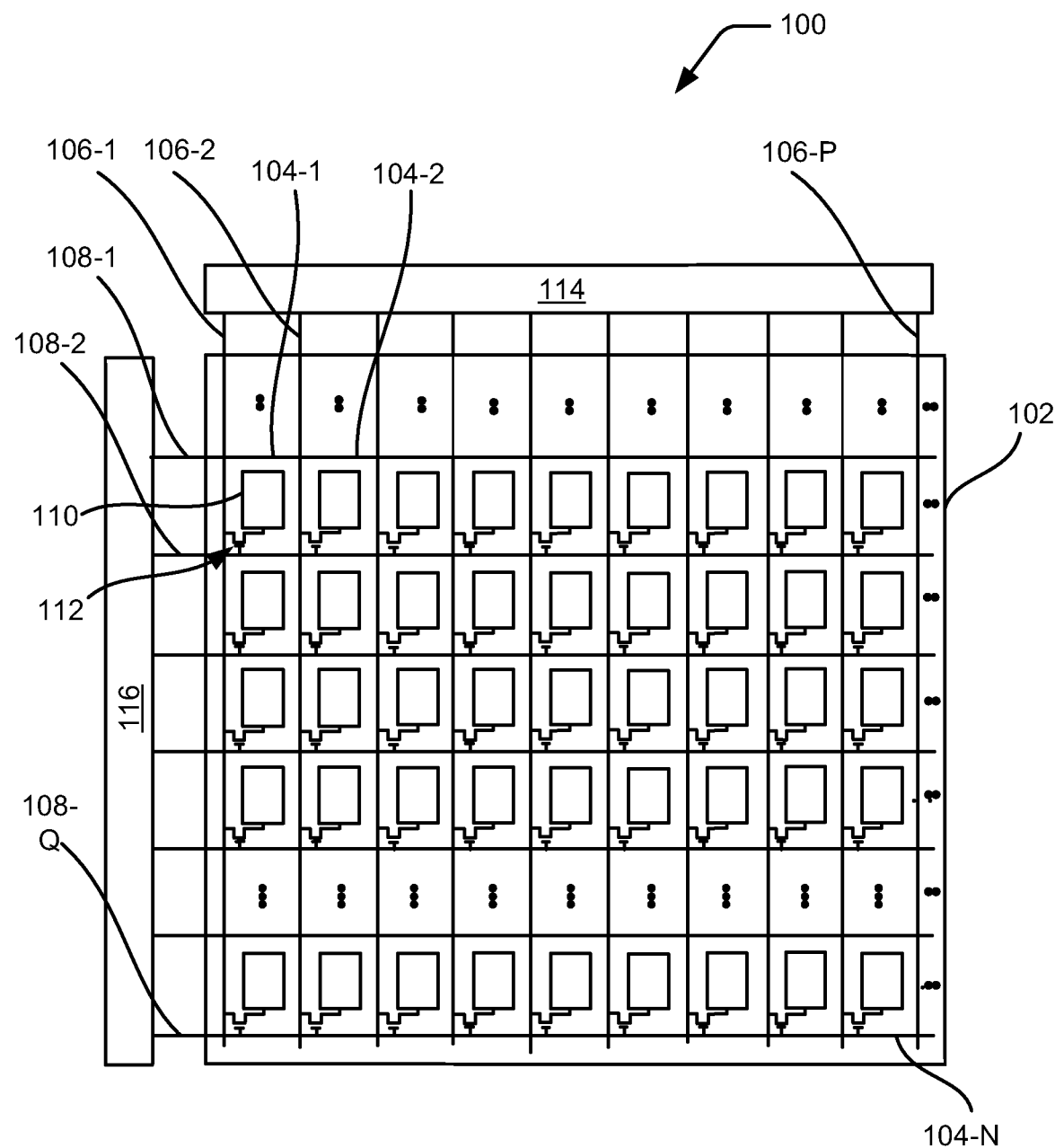
FIG. 1 schematically illustrates a plan view of a liquid crystal display (LCD) device, according to an example implementation of the present subject matter.

An LCD device, typically, includes a liquid crystal layer disposed between a pair of substrates. The LCD device, apart from other elements, also includes a plurality of source lines and a plurality of gate lines. The gate lines cross the source lines in the form of a matrix or a grid-like arrangement. That is, in an example, the source lines may be arranged column-wise, and the gate lines, crossing the source lines, may be arranged row-wise. Two adjacent source lines and two adjacent gate lines, crossing said adjacent source lines, define a pixel of the LCD device. The LCD device also includes a black matrix overlapping at least the source lines and the gate lines to provide a light shielding effect from a viewing side of the LCD device. An aperture region between two adjacent rows and two adjacent columns of the black matrix may determine an aperture ratio of each pixel of the LCD device.

Each pixel of the LCD device includes a pixel electrode. The pixel electrode of the pixel spans a substantial area of the liquid crystal layer associated with the pixel. When a voltage is applied to the pixel, an electric field is generated to alter the orientation of the long axes of the liquid crystal molecules of the associated liquid crystal layer. The electric field alters the orientation in a way such that the long axes of the liquid crystal molecules are substantially parallel to the substrates, between which the liquid crystal layer is disposed. The alteration of the orientation of the liquid crystal molecules allows the light from a backlight, to transmit through the liquid crystal layer, and thus display content from the pixel. LCD devices in which display is produced by controlling the orientation of liquid crystal molecules substantially parallel to the substrates are referred to as In-plane Switching (IPS) type LCD devices.

The pixel electrode of a pixel, typically, includes a plurality of slits of predefined width. The slits enable formation of a plurality of long and narrow electrodes within the pixel electrode. In an example, the slits may be formed in the pixel electrode such that one set of slit segments extends in a first direction and another set of slit segments extends in a second direction. A common boundary area of the two sets of slit segments in the pixel electrode may be substantially in the middle of the long and narrow electrodes. Further, in said example of slits, edge portions of the slits may be bent and extended in another direction different from the first direction and the second direction. In another example, the slits may be formed in the pixel electrode such that a main, central portion of each of the slits extends in one direction, and edge portions of each of the slits are bent and extended in another direction different from the direction of extension of the main portion.

The transmittance of light from a region of common boundary area of the two sets of slit segments in the pixel electrode, and from a region of the pixel at the edge portions of slits in the pixel electrode is low and non-uniform with respect to that from the other regions of the pixel. Low and non-uniform transmittance of light from such regions creates grey zones and shadows in the display from the pixel. Thus, such non-uniform transmittance characteristics of the pixel leads to a poor contrast of display from the pixel, thereby affecting the quality of display from the LCD device.

According to example implementations of the present subject matter, LCD devices are described, in which light blocking members are disposed to overlap regions of pixels at the common boundary area of the two sets of slit segments in the pixel electrode and/or overlap regions of pixels at edge portions of slits in pixel electrodes, depending on the configuration of the pixel electrodes for the pixels. The light blocking members, blocking light through the pixels and particularly through such regions of pixels, facilitate in increasing the contrast of the display from the pixels and improving the quality of display from the LCD device.

An LCD device of the present subject matter includes a first substrate, a second substrate opposite to the first substrate, and a liquid crystal layer between the first substrate and the second substrate. The second substrate includes a plurality of source lines and a plurality of gate lines crossing the plurality of source lines. The second substrate also includes a plurality of pixels in a matrix arrangement. A pixel of the plurality of pixels is defined by two adjacent source lines from the plurality of source lines and two adjacent gate lines from the plurality of gate lines. The pixel includes a pixel electrode with a plurality of slits. Further, the first substrate includes a black matrix. The black matrix overlaps at least the plurality of source lines and the plurality of gate lines of the second substrate in plan view.

In an example implementation of the present subject matter, the plurality of slits of the pixel electrode includes a first set of slit segments extending in a first direction, and a second set of slit segments extending in a second direction. The second direction is different from the first direction.

In an example implementation of the present subject matter, the second substrate includes a first light blocking member for blocking light through the pixel, where the first light blocking member extends along a common boundary area of the first set of slit segments and the second set of slit segments. The first light blocking member, also be referred to as an intermediate light blocking member, is made of a metal or a semiconductor.

In another example implementation of the present subject matter, the second substrate includes a second light blocking member for blocking light through the pixel, where the second light blocking member overlaps edge portions of the plurality of slits in plan view of the pixel. In an example implementation, the edge portions of the plurality of slits of the pixel electrode may extend in another direction, which is different from the first direction and the second direction. The second light blocking member is made of a metal. The metal may include, but is not restricted to, aluminum, molybdenum, titanium, copper. The second light blocking member may also be referred to as a slit-edge light blocking member.

In a yet another example implementation of the present subject matter, the second substrate includes both the first light blocking member extending along the common boundary area of the first set of slit segments and the second set of slit segments and the second light blocking member overlapping the edge portions of the plurality of slits. The first light blocking member is made of a metal or a semiconductor, and the second light blocking member is made of a metal.

In an example implementation of the present subject matter, each of the plurality of slits of the pixel electrode includes a main portion continuously connecting with an edge portion of the slit, where the main portion extends in a direction different from an extending direction of the edge portion in each of the slits. The second substrate includes a slit-edge light blocking member overlapping the edge portion of each of the plurality of slits in plan view of the pixel. The slit-edge light blocking member is made of a metal. The metal may include, but is not restricted to, aluminum, molybdenum, titanium, copper.

The above described LCD devices are further described with reference to FIGS. 1-16. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

As used herein, the singular forms "a", "an" and "the" are intended to include the plural forms as well, unless the context clearly indicates otherwise. The terms "first" and "second" are for differentiating one element from the other element, and these elements should not be limited by these terms. Although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed herein could be termed a second element, component, region, layer or section without departing from the teachings of the present subject matter.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

It will be also understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

Also, spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the elements in use or operation in addition to the orientation depicted in the figures.

FIG. 1 schematically illustrates a plan view of a liquid crystal display (LCD) device 100, according to an example implementation of the present subject matter. The LCD device 100 includes a display panel 102 having a plurality of pixels 104-1, 104-2, . . . , 104-N arranged in a matrix arrangement. The pixels collectively and individually are referenced as 104. The display panel 102 includes a first substrate (not shown in FIG. 1), a second substrate (not shown in FIG. 1) opposite to the first substrate, and a liquid crystal layer (not shown in FIG. 1) between the first substrate and the second substrate, forming the pixels 104. The first substrate is towards a viewing side of the display panel 102, and the second substrate is towards a back side of the display panel 102. The liquid crystal layer includes liquid crystal molecules.

The display panel 102 also includes a plurality of source lines 106-1, 106-2, . . . , 106-P, and a plurality of gate lines 108-1, 108-2, . . . , 108-Q. The source lines and the gate lines, collectively and individually referenced as 106 and 108, respectively, are in the second substrate of the display panel 102. The source lines and the gate lines may be made of aluminum, copper, molybdenum, titanium, a stacked layer of aluminum, copper, molybdenum and titanium, an alloy of tungsten or magnesium with aluminum, copper, molybdenum, and/or titanium, or a stacked layer of a combination of above.

Two adjacent source lines 106-1 and 106-2 and two adjacent gate lines 108-1 and 108-2 define a pixel 104-1 of the display panel 102. Each pixel 104 includes a pixel electrode 110 and a thin film transistor (TFT) 112. The pixel electrode 110 is made of a transparent material, for example, an indium-tin oxide. One of the two adjacent source lines that bound the pixel 104 is coupled to a drain electrode of the TFT 112 of the pixel 104. One of the two adjacent gate lines that bound the pixel 104 is coupled to a gate electrode of the TFT 112 of the pixel 104. A source electrode of the TFT 112 is coupled to the pixel electrode 110.

The second substrate of the display panel 102 includes a common electrode (not shown in FIG. 1) opposite to the pixel electrode 110 of each pixel 104, and a plurality of common metal lines electrically connected to the common electrode. The common electrode is made of a transparent material, such as indium-tin oxide, indium-zinc oxide. The common metal lines are made of aluminum, copper, molybdenum, titanium, a stacked layer of aluminum, copper, molybdenum and titanium, an alloy of tungsten or magnesium with aluminum, copper, molybdenum, and/or titanium, or a stacked layer of a combination of the above.

The first substrate includes a black matrix (not shown in FIG. 1), which covers the source lines 106, the gate lines 108, and the TFTs 112 to provide a light shielding effect from the viewing side of the display panel 102. The black matrix also prevents mixing of colors displayed by adjacent pixels. The black matrix is made of a resin material or a metallic material having black pigments. The black matrix determines an aperture region for each pixel 104, which defines an aperture ratio of the each pixel 104.

The LCD device 100 also includes a source driver 114 electrically connected to the source lines 106, a gate driver 116 electrically connected to the gate lines 108, and a common electrode driver (not shown in FIG. 1) electrically connected to the common metal lines. The source driver 114 supplies a data voltage to the drain electrodes of the TFTs 112 of the pixels 104 through the source lines 106, the gate driver 116 supplies a gate voltage to the gate electrodes of the TFTs 112 of the pixels 104 through the gate lines 108, and the common electrode driver supplies a common voltage to the common electrode through the common metal lines. The TFT 112 of a pixel 104 may be turned ON or OFF to feed the data voltage to the pixel electrode 110 of the pixel 104. The data voltage at the pixel electrode 110 of a pixel 104 with respect to the common voltage at the common electrode generates an electric field, which alters the orientation of the long axes of the liquid crystal molecules in the liquid crystal layer to produce an image.

Figure 2A:
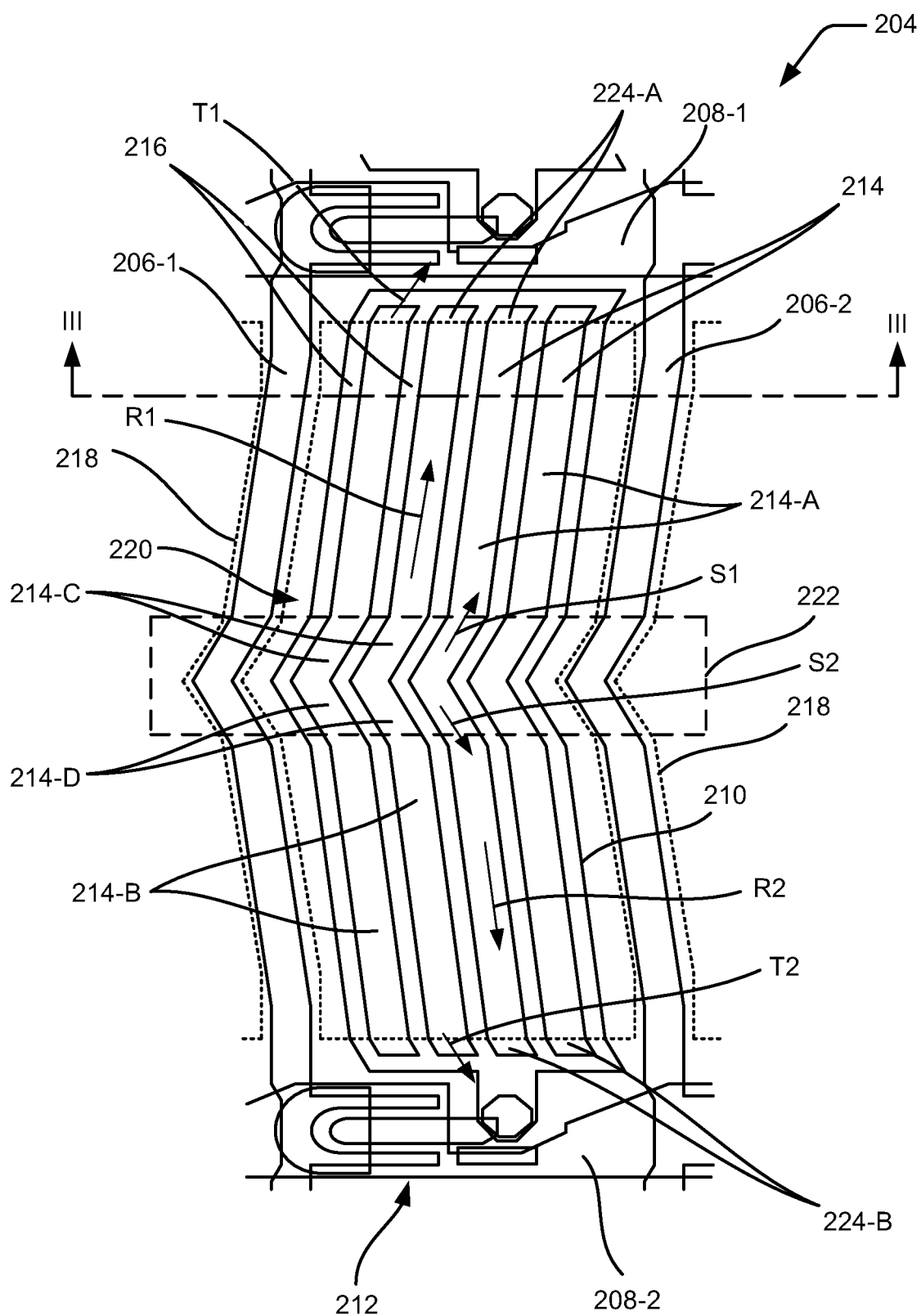
FIG. 2A schematically illustrates a plan view of an example pixel of the LCD device.

FIG. 2A schematically illustrates a plan view of an example pixel 204 of the LCD device 100. The pixel 204 may be any of the pixels 104 of the display panel 102 of the LCD device 100. The pixel 204 is bounded by two source lines 206-1 and 206-2, and two gate lines 208-1 and 208-2. The pixel 204 includes a pixel electrode 210 and a TFT 212. As shown, the source lines 206-1 and 206-2, the gate lines 208-1 and 208-2, and the TFT 212 are covered by a black matrix 218. The black matrix 218 (shown with dotted lines) determines an aperture region 220 which defines the aperture ratio of the pixel 204.

As shown, the pixel electrode 210 includes a plurality of slits 214 (hereinafter "slits 214"). The slits 214 are of a predefined width, which as a result form a plurality of long and narrow electrodes 216 in the pixel electrode 210. The slits 214, as shown, include a first set of slit segments 214-A extending in a first direction and a second set of slit segments 214-B extending in a second direction. The first direction and the second direction, herein, are referenced by arrows R1 and R2, respectively. A common boundary area 222 of the two sets of slit segments 214-A and 214-B in the pixel electrode 210 may be substantially in the middle of the long and narrow electrodes 216. Further, the slits 214, as shown, include a third set of slit segments 214-C extending in a third direction and a fourth set of slit segments 214-D extending in a fourth direction. The third direction and the fourth direction, herein, are referenced by arrows S1 and S2, respectively. The first set of slit segments and the second set of slit segments are connected through the third set of slit segments and the fourth set of slit segments, as shown.

Further, edge portions of the slits 214 extend in a direction different from the first direction and the second direction. As shown in FIG. 2A, the edge portions 224-A on one side of the slits 214 extend in a fifth direction, referenced by arrow T1, which is different from the first direction and the second direction. Similarly, as shown in FIG. 2A, the edge portions 224-B on the other side of the slits 214 extend in a sixth direction, referenced by arrow T2, which is different from the first direction and the second direction.

Figure 2B:
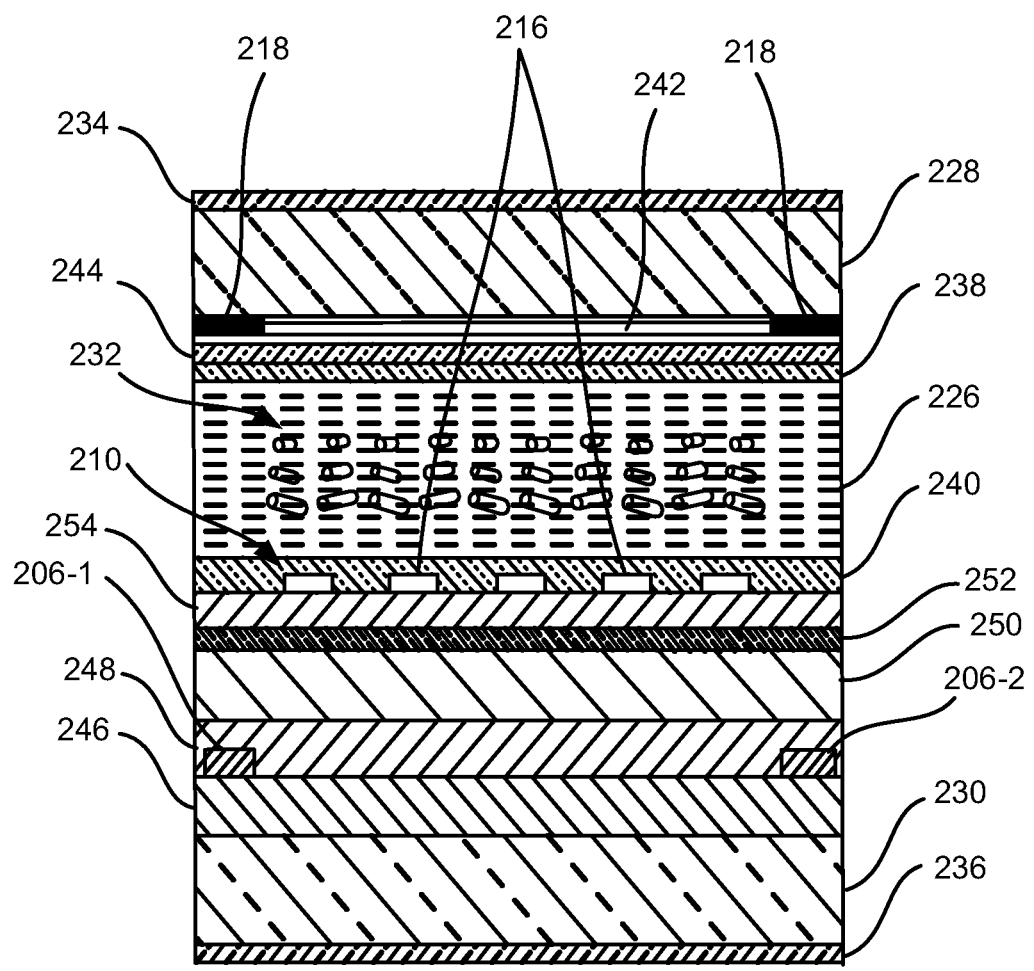
FIG. 2B schematically illustrates a cross-sectional view along line III-III of FIG. 2A.

FIG. 2B schematically illustrates a cross-sectional view along line III-III of FIG. 2A. FIG. 2B shows a liquid crystal layer 226 between an upper substrate 228 and a lower substrate 230. The upper substrate 228 and the lower substrate 230 are made of a transparent material, such as glass or a transparent plastic. The liquid crystal layer 226 includes liquid crystal molecules 232. A first polarizer 234 is disposed on an outer surface of the upper substrate 228, and a second polarizer 236 is disposed on an outer surface of the lower substrate 230, as shown in FIG. 2B. The first polarizer 234 and the second polarizer 236 are disposed such that their polarization axes are perpendicular to each other.

Further, a first alignment layer 238 and a second alignment layer 240 are disposed on both sides of the liquid crystal layer 226. The first alignment layer 238 and the second alignment layer 240 are for fixing the alignment of the liquid crystal molecules 232 in the liquid crystal layer 226. The first and second alignment layers 238 and 240 may be made of a polyamide.

Further, as shown in FIG. 2B, a color filter 242 is formed on the upper substrate 228. The color filter includes pigments of red, green, or blue color, depending on the colored light required from the pixel 204. An overcoat layer 244 is coated on the color filter 242. The overcoat layer 244 prevents pigments from releasing out to the liquid crystal layer 226.

Further, a gate insulating layer 246 is formed on an inner surface of the lower substrate 230. The gate insulating layer 246 cover the gate lines 208-1 and 208-2 (shown in FIG. 1). The gate insulating layer 246 may be formed of silicon nitride (SiN), silicon dioxide ($SiO_2$), or alumina. As shown in FIG. 2B, source lines 206-1 and 206-2 are on the gate insulating layer 246. A protective insulating layer 248 is formed to cover the source lines 206-1 and 206-2. The protective insulating layer 248 may be formed of silicon nitride (SiN) or silicon dioxide ($SiO_2$). Further, an organic protective insulating layer 250 is formed on the protective insulating layer 248. The organic protective insulating layer 250 is a photosensitive resist and is made of an acrylic material.

Further, as shown in FIG. 2B, a common electrode 252 is formed on the organic protective insulating layer 250. The common electrode 252 is made of a transparent material, such as indium-tin oxide, indium-zinc oxide. An upper portion insulating layer 254 is formed on the common electrode 252. The upper portion insulating layer 254 is made of silicon nitride (SiN) or silicon dioxide (SiO$_2$).

Further, as shown, the pixel electrode 210 is formed on the upper portion insulating layer 254. The long and narrow electrodes 216 of the pixel electrode 210 are visible in the cross-sectional view in FIG. 2B. Further, the black matrix 218 is formed on an inner side of the upper substrate 228. The black matrix 218 prevents mixing of colors displayed by pixels adjacent to the pixel 204.

It may be noted that the upper substrate 228, the color filter 242, the black matrix 218, and other components or layers formed on the upper substrate 228 may constitute the first substrate of the display panel 102 of the LCD device 100. Similarly, it may be noted that the lower substrate 230, the gate lines, the gate insulating layer 246, the source lines, the common electrode 252, and other components or layers formed on the lower substrate 230 may constitute the second substrate of the display panel 102 of the LCD device 100.

Figure 3:
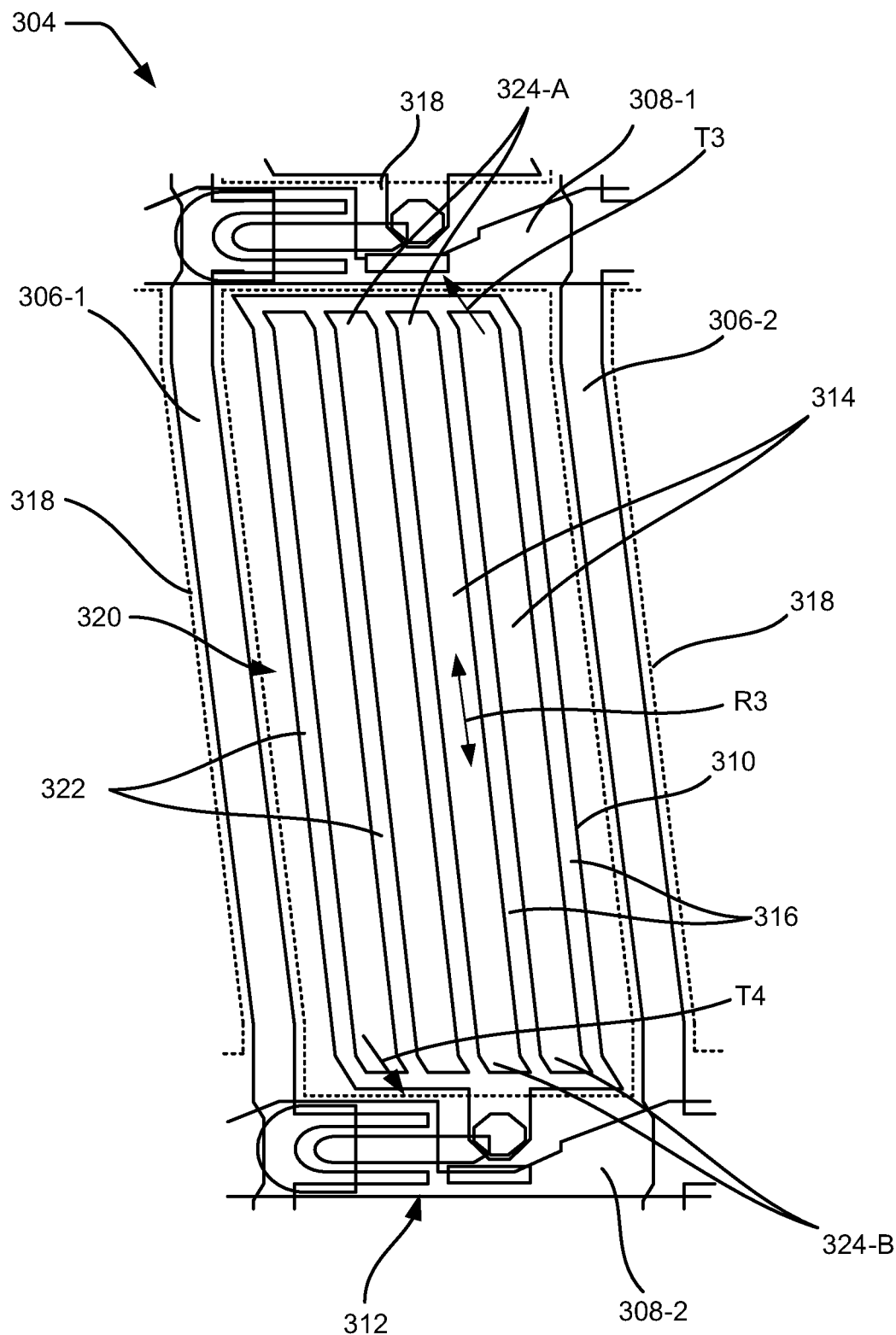
FIG. 3 schematically illustrates a plan view of an example pixel of the LCD device.

FIG. 3 schematically illustrates a plan view of an example pixel 304 of the LCD device 100. The pixel 304 may be any of the pixels 104 of the display panel 102 of the LCD device 100. The pixel 304 is bounded by two source lines 306-1 and 306-2, and two gate lines 308-1 and 308-2. The pixel 304 includes a pixel electrode 310 and a TFT 312. As shown, the source lines 306-1 and 306-2, the gate lines 308-1 and 308-2, and the TFT 312 are covered by a black matrix 318. The black matrix 318 (shown with dotted lines) determines an aperture region 320 which determines the aperture ratio of the pixel 304.

As shown, the pixel electrode 310 includes a plurality of slits 314 (hereinafter "slits 314"). The slits 314 are of a predefined width, which as a result form a plurality of long and narrow electrodes 316 in the pixel electrode 310. As shown, each of the slits 314 includes a main portion 322 and edge portions 324-A and 324-B. The main portion 322 extends in a direction different from an extending direction of the edge portions 324-A and 324-B. As shown, the main portion 322 of each of the slits 314 extends in a seventh direction, referenced by an arrow R3. The edge portion 324-A on one side of each of the slits 314 extend in a eighth direction, referenced by arrow T3, which is different from the seventh direction. Similarly, the edge portion 324-B on the other side of each of the slits 314 extends in a ninth direction, referenced by arrow T4, which is different from the seventh direction. It may be noted that the cross-section view of the pixel 304 may be similar to the cross-sectional view of the pixel 204 shown in FIG. 2B.

Figure 4:
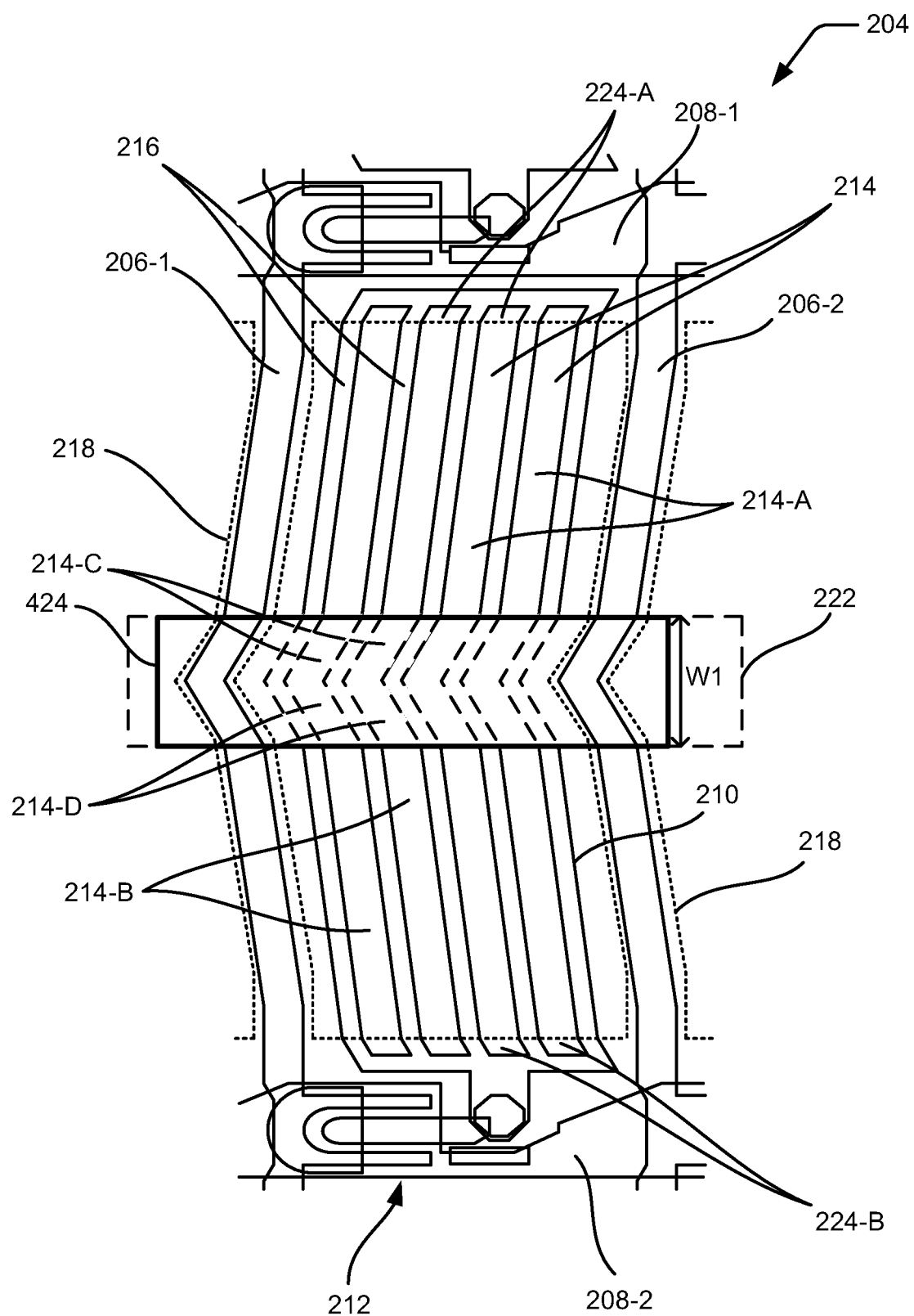
FIG. 4 schematically illustrates a plan view of a pixel of the LCD device with a first light blocking member, according to an example implementation of the present subject matter.

FIG. 4 schematically illustrates a plan view of the pixel 204 of the LCD device 100 with a first light blocking member 424, according to an example implementation of the present subject matter. The pixel 204 may be any of the pixels 104 of the display panel 102 of the LCD device 100.

As shown in FIG. 4, the first light blocking member 424 extends along a common boundary area 222 of the first set of slit segments 214-A and the second set of slit segments 214-B. In an example implementation, the first light blocking member 424 entirely overlaps the third set of slit segments 214-C and the fourth set of slit segments 214-D of the slits 214 in plan view. The first light blocking member 424 is made of a material such that light through a region of the common boundary area 222 of the first and the second sets of slit segments in the pixel 204, which otherwise is transmitted, is blocked by the first light blocking member 424. The first light blocking member 424 may also be referred to as an intermediate light blocking member. It may be noted that the black matrix 218 overlaps the edge portions 224-A and 224-B of the slits 214, as shown in FIG. 4.

In an example implementation, the first light blocking member 424 may have a width W1 in a range of about 10 μm to about 30 μm. In an example implementation, the first light blocking member 424 may be made of a metal. The metal may include, but is not restricted to, aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti). The first light blocking member 424 may also be formed of a stacked layer of aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti), or a stacked layer of a combination of the above.

Figure 5:
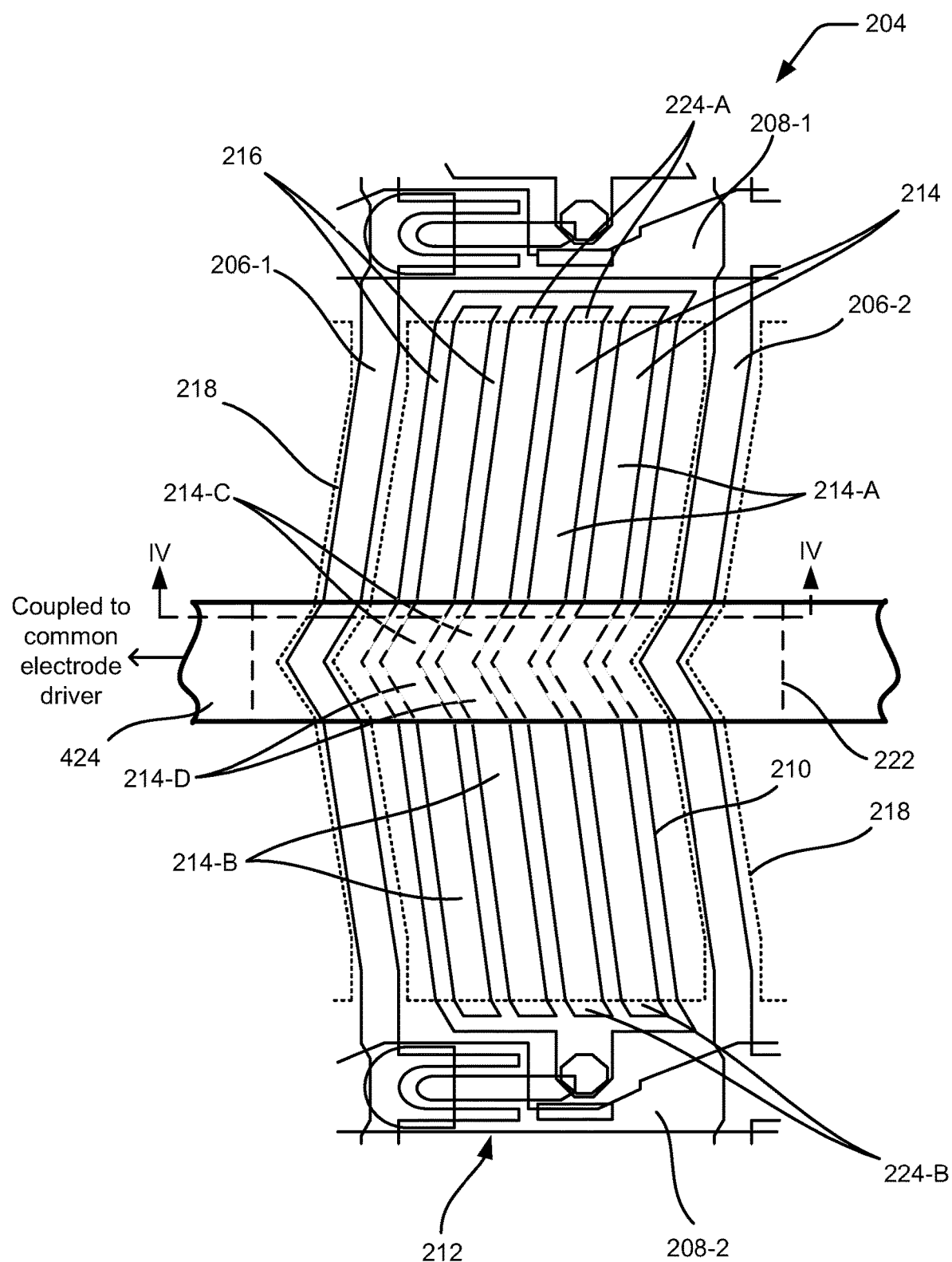
FIG. 5 schematically illustrates a plan view of the pixel of the LCD device with the first light blocking member as a part of a plurality of common metal lines, according to an example implementation of the present subject matter.
Figure 6:
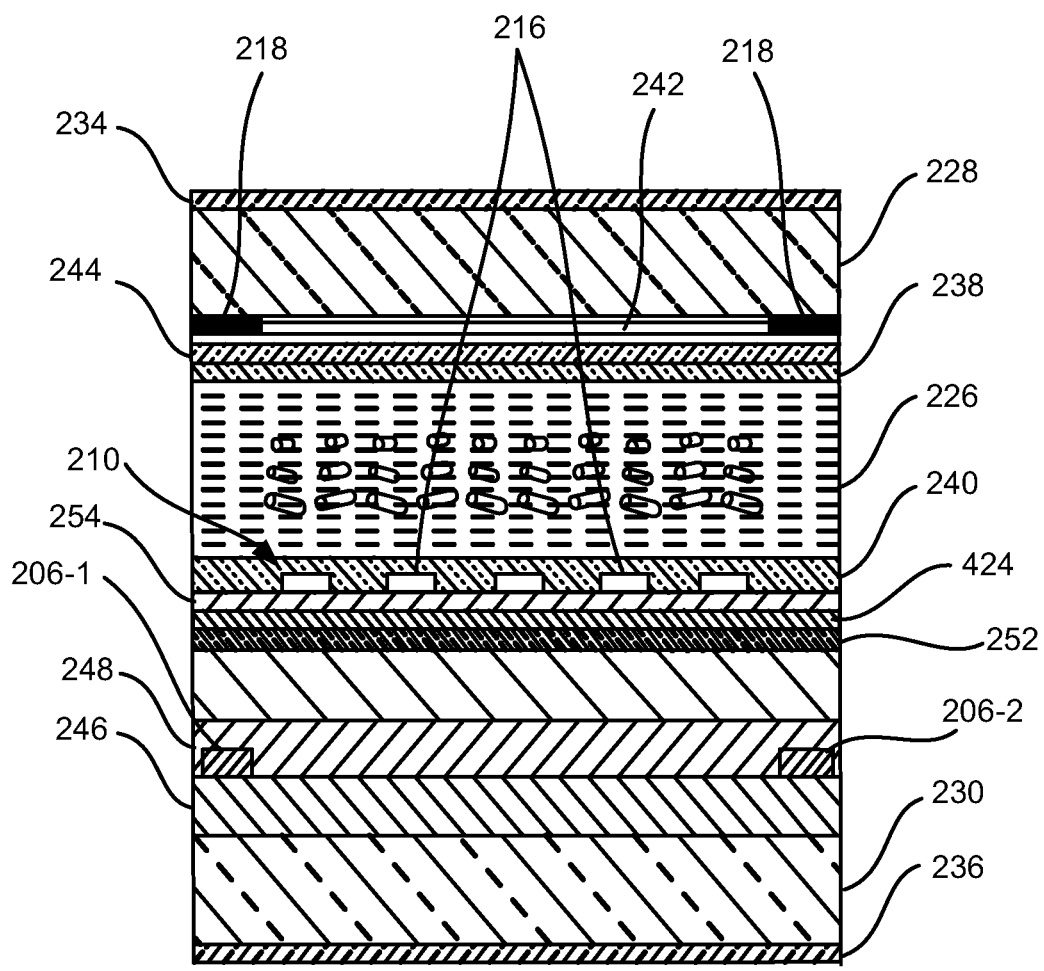
FIG. 6 schematically illustrates a cross-sectional view along line IV-IV of FIG. 5, according to an example implementation of the present subject matter.

In an example implementation, the first light blocking member 424 and the plurality of common metal lines are formed in a same layer and are made of the same metal. In an example implementation, the first light blocking member 424 is a part of the plurality of common metal lines, as shown in FIG. 5 which schematically illustrates a plan view of the pixel 204 of the LCD device 100. In said example implementation, the first light blocking member 424 is one of the plurality of common metal lines electrically coupled to the common electrode driver in the LCD device 100. FIG. 6 schematically illustrates a cross-sectional view along line IV-IV of FIG. 5, according to an example implementation of the present subject matter. As shown in FIG. 6, the first light blocking member 424 is disposed on, and is electrically connected to, the common electrode 252 of the LCD device 100.

In an example implementation, the first light blocking member 424 and the plurality of source lines are formed in a same layer. The first light blocking member 424 and the plurality of source lines may be made of the same metal. In an example implementation, the first light blocking member 424 is electrically connected to one of the two adjacent source lines bounding the pixel 204 and is electrically isolated from the other of the two adjacent source lines bounding the pixel 204. In another example implementation, the first light blocking member 424 is electrically isolated from the two adjacent source lines bounding the pixel 204.

Figure 7:
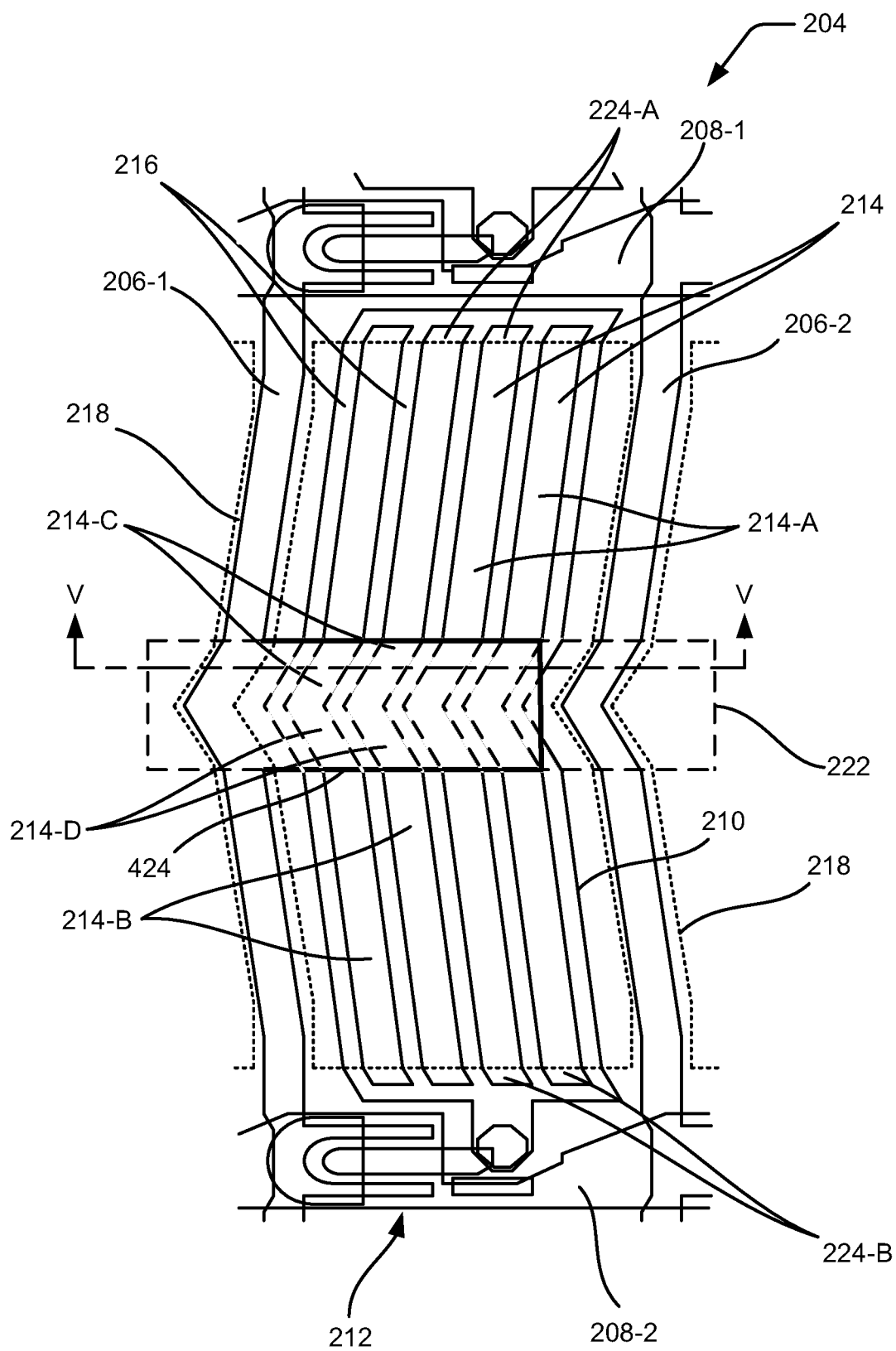
FIG. 7 schematically illustrates a plan view of the pixel of the LCD device with the first light blocking member and a plurality of source lines in a same layer, according to an example implementation of the present subject matter.
Figure 8:
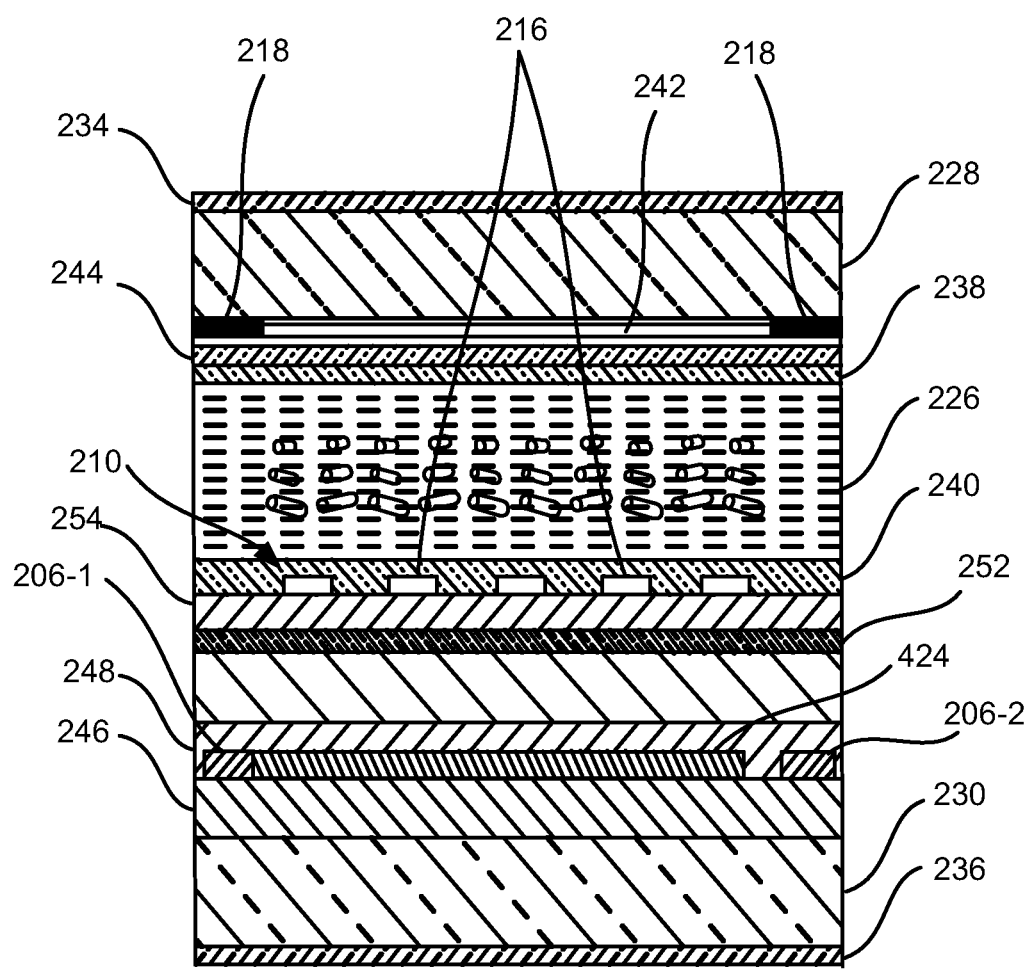
FIG. 8 schematically illustrates a cross-sectional view along line V-V of FIG. 7, according to an example implementation of the present subject matter.

FIG. 7 schematically illustrates a plan view of the pixel 204 of the LCD device 100 with the first light blocking member 424 and the plurality of source lines 206-1 and 206-2 in a same layer, according to an example implementation of the present subject matter. FIG. 8 schematically illustrates a cross-sectional view along line V-V of FIG. 7, according to an example implementation of the present subject matter. As shown in FIGS. 7 and 8, the first light blocking member 424 is electrically connected to the source line 206-1 and is electrically isolated from the source line 206-2.

Figure 9:
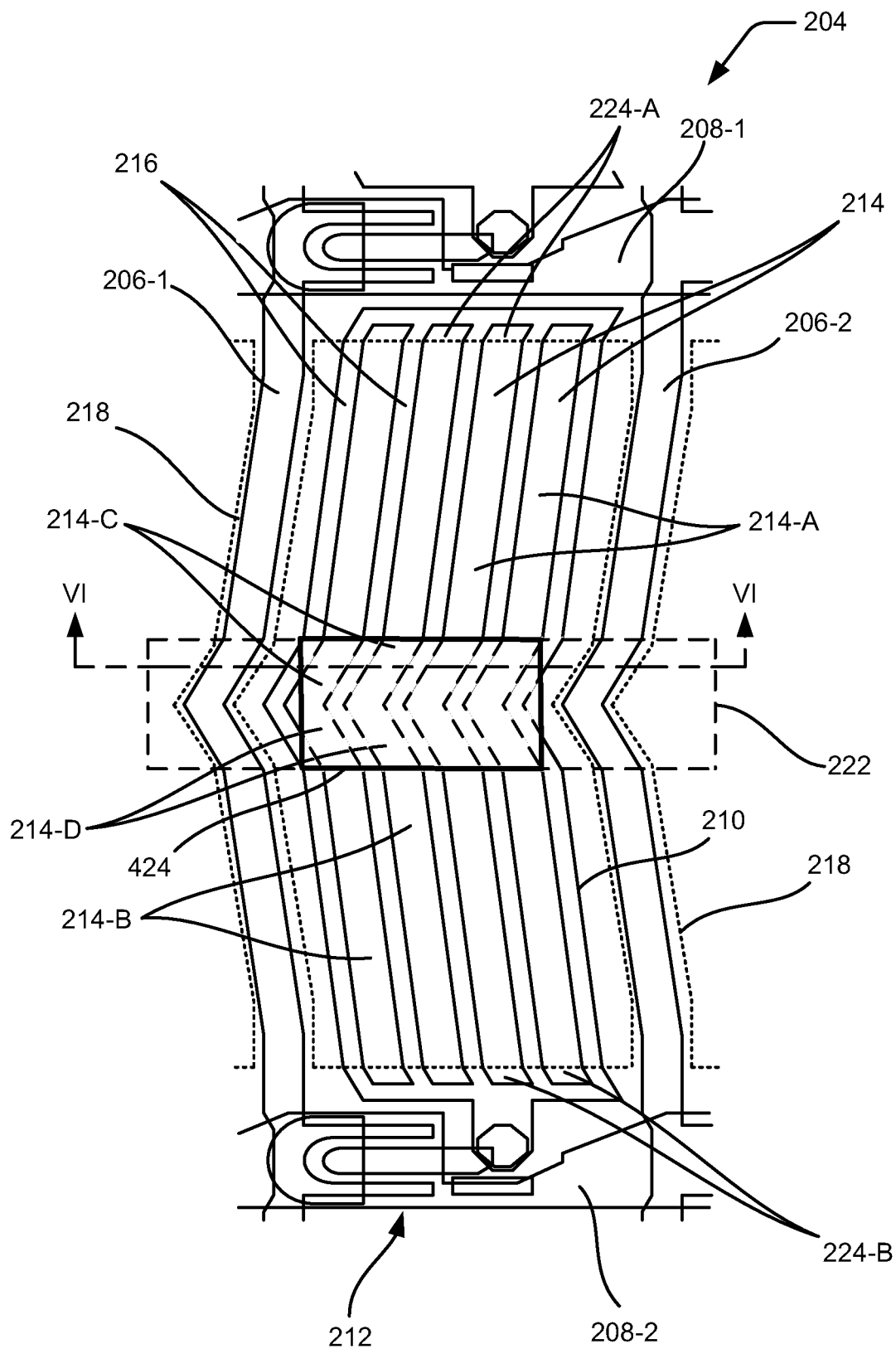
FIG. 9 schematically illustrates a plan view of the pixel of the LCD device with the first light blocking member and a plurality of source lines in a same layer, according to an example implementation of the present subject matter.
Figure 10:
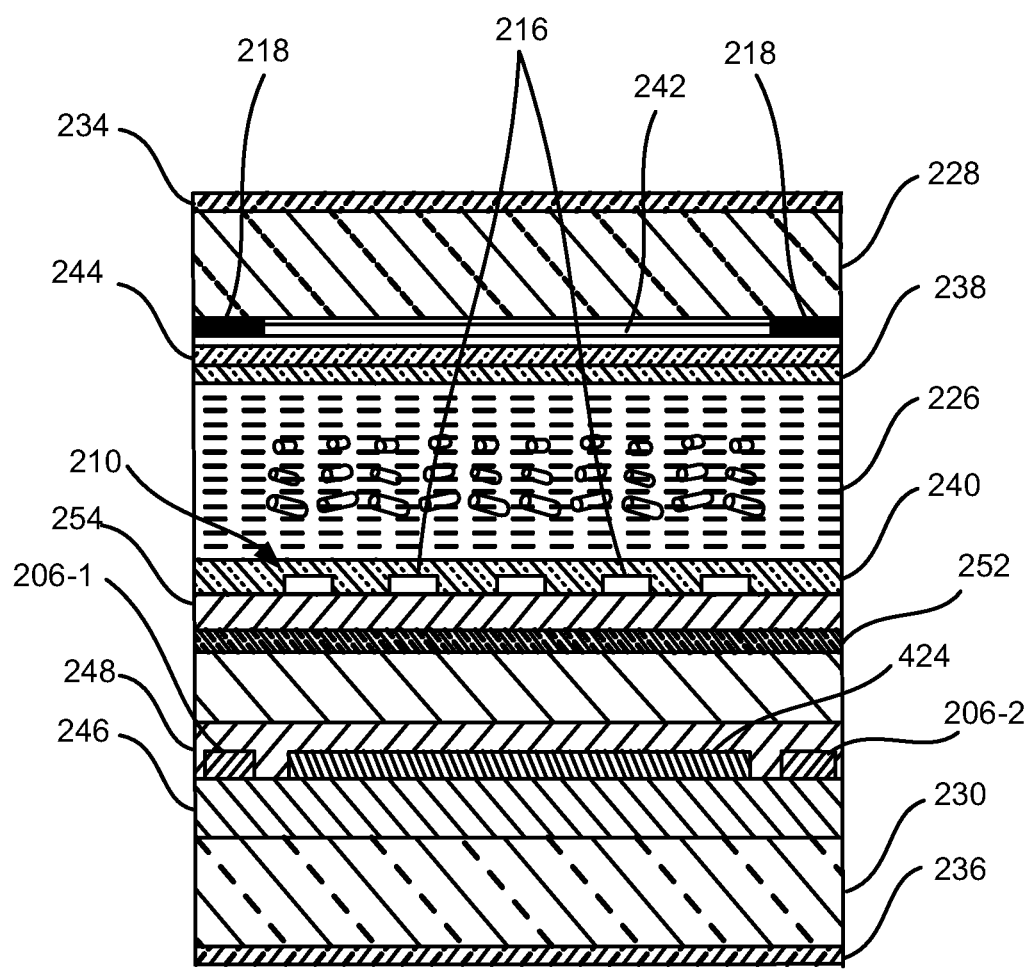
FIG. 10 schematically illustrates a cross-sectional view along line VI-VI of FIG. 9, according to an example implementation of the present subject matter.

FIG. 9 schematically illustrates a plan view of the pixel 204 of the LCD device 100 with the first light blocking member 424 and the plurality of source lines 206-1 and 206-2 in a same layer, according to an example implementation of the present subject matter. FIG. 10 schematically illustrates a cross-sectional view along line VI-VI of FIG. 9, according to an example implementation of the present subject matter. As shown in FIGS. 9 and 10, the first light blocking member 424 is electrically isolated from both the source lines 206-1 and 206-2.

Returning to FIG. 4, in an example implementation, the first light blocking member 424 may be made of a semiconductor. The semiconductor may include, but is not restricted to, an amorphous silicon, an oxide semiconductor or a low-temperature poly-silicon. In an example, the oxide semiconductor may be an oxide of indium-gallium-zinc. The first light blocking member 424, of a semiconductor, and a semiconductor layer of the TFT 212 of the pixel 204 are formed in a same layer and are made of the same semiconductor.

Figure 11:
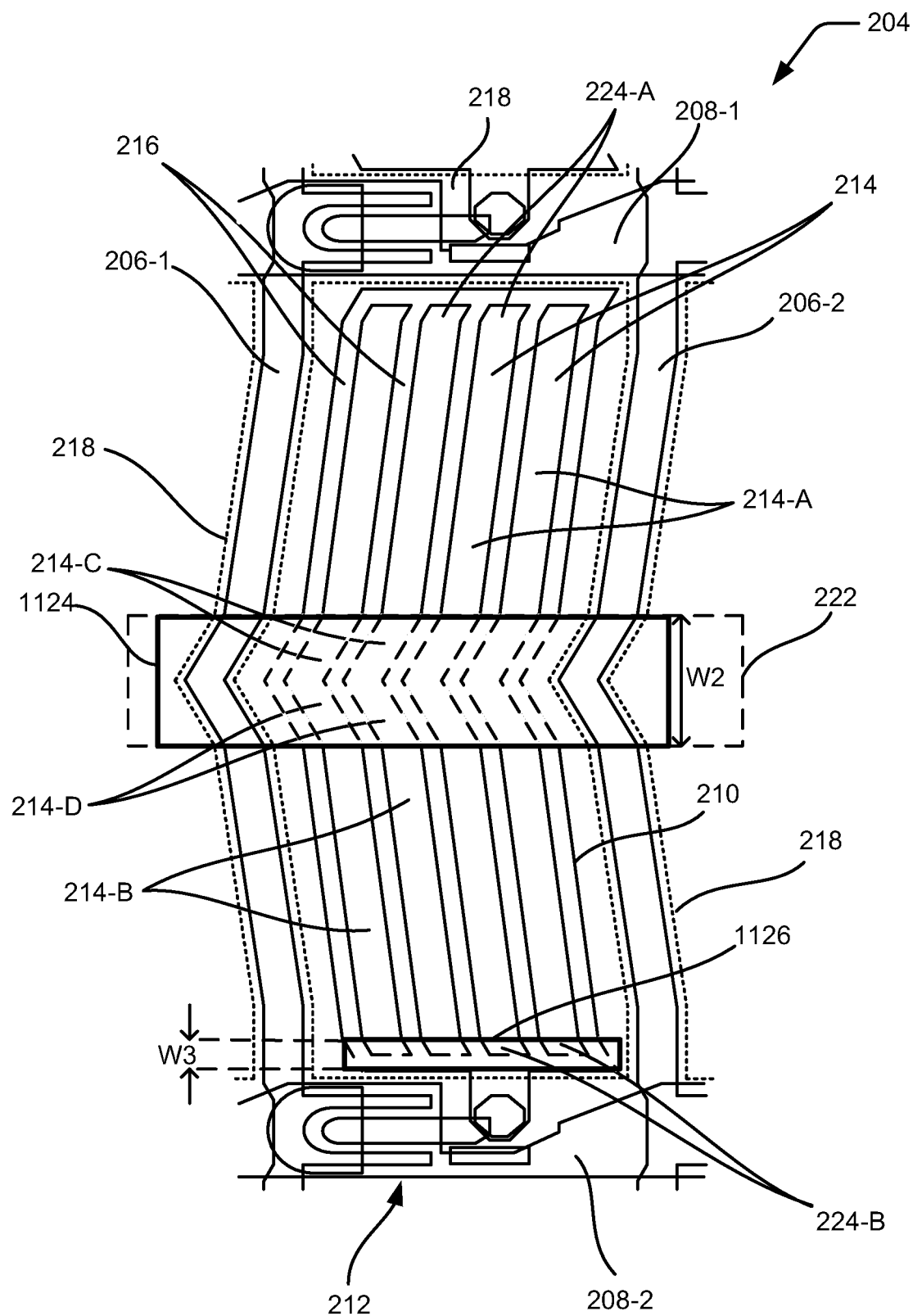
FIG. 11 schematically illustrates a plan view of a pixel of the LCD device with a first light blocking member and a second light blocking member, according to an example implementation of the present subject matter.

FIG. 11 schematically illustrates a plan view of a pixel 204 of the LCD device 100 with a first light blocking member 1124 and a second light blocking member 1126, according to an example implementation of the present subject matter. The pixel 204 may be any of the pixel 104 of the display panel 102 of the LCD device 100.

As shown in FIG. 11, the first light blocking member 1124 extends along a common boundary area 222 of the first set of slit segments 214-A and the second set of slit segments 214-B. In an example implementation, the first light blocking member 1124 may be made of a metal or a semiconductor, as described earlier in the description, to block light through a region of the common boundary area 222 of the first and the second sets of slit segments of the pixel electrode 210 in the pixel 204. In an example implementation, the first light blocking member 1124 may have a width W2 in a range of about 10 μm to about 30 μm. The first light blocking member 1124 may also be referred to as an intermediate light blocking member.

Further, as shown in FIG. 11, the second light blocking member 1126 overlaps the edge portions 224-B of the slits 214 in the pixel electrode 210. The second light blocking member 1126 is made of a metal such that light through a region of the edge portions 224-B of the slits 214 is blocked by the second light blocking member 1126. The metal may include, but is not restricted to, aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti). The second light blocking member 1126 may also be formed of a stacked layer of aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti), or a stacked layer of a combination of the above. In an example implementation, the second light blocking member 1126 may have a width W3 in a range of about 1 μm to about 10 μm. The second light blocking member 1126 may also be referred to as a slit-edge light blocking member.

Although, FIG. 11 shows the edge portions at one side of the slits 214 being overlapped by a light blocking member, in an example implementation, the pixel 204 may also include a third light blocking member (not shown in FIG. 11) made of a metal and overlapping the edge portions 224-A of the slits 214 in the pixel electrode 210. The third light blocking member blocks light through a region of the edge portions 224-A of the slits 214. The third light blocking member and the second light blocking member 1126 may be made of the same metal and may have the same width W3.

It may be noted that typically the edge portions of the slits of the pixel electrode of each pixel in the display panel are overlapped by the black matrix. However, when the edge portions of the slits of the pixel electrode are overlapped by a slit-edge light blocking member, in accordance with an example implementation of the present subject matter, the black matrix may not overlap the edge portions. The slit-edge light blocking member, in accordance with the present subject matter, is formed in the second substrate of the display panel, whereas the black matrix is formed in the first substrate. Since the tolerance between the first substrate and the second substrate is high, the slit-edge light blocking member can be made smaller than the black matrix typically overlapping the edge portions. In an alternate example implementation, both the black matrix and the slit-edge light blocking member may overlap the edge portions of the slits.

The first light blocking member 1124 of the pixel 204 may be made similar to as described and illustrated through FIGS. 5 to 10. In an example implementation, the second light blocking member 1126 and the plurality of common metal lines are formed in a same layer and are made of the same metal. In said example implementation, the second light blocking member 1126 is disposed on, and is electrically connected to, the common electrode of the LCD device 100. Further, in said example implementation, the second light blocking member 1126 does not overlap the black matrix 218.

In an example implementation, the second light blocking member 1126 and the plurality of source lines are formed in a same layer. The second light blocking member 1126 and the plurality of source lines may be made of the same metal. In an example implementation, the second light blocking member 1126 is electrically connected to one of the two adjacent source lines bounding the pixel 204 and is electrically isolated from the other of the two adjacent source lines bounding the pixel 204. In another example implementation, the second light blocking member 1126 is electrically isolated from the two adjacent source lines bounding the pixel 204. Further, in the above example implementations, the second light blocking member 1126 does not overlap the black matrix 218.

Figure 12:
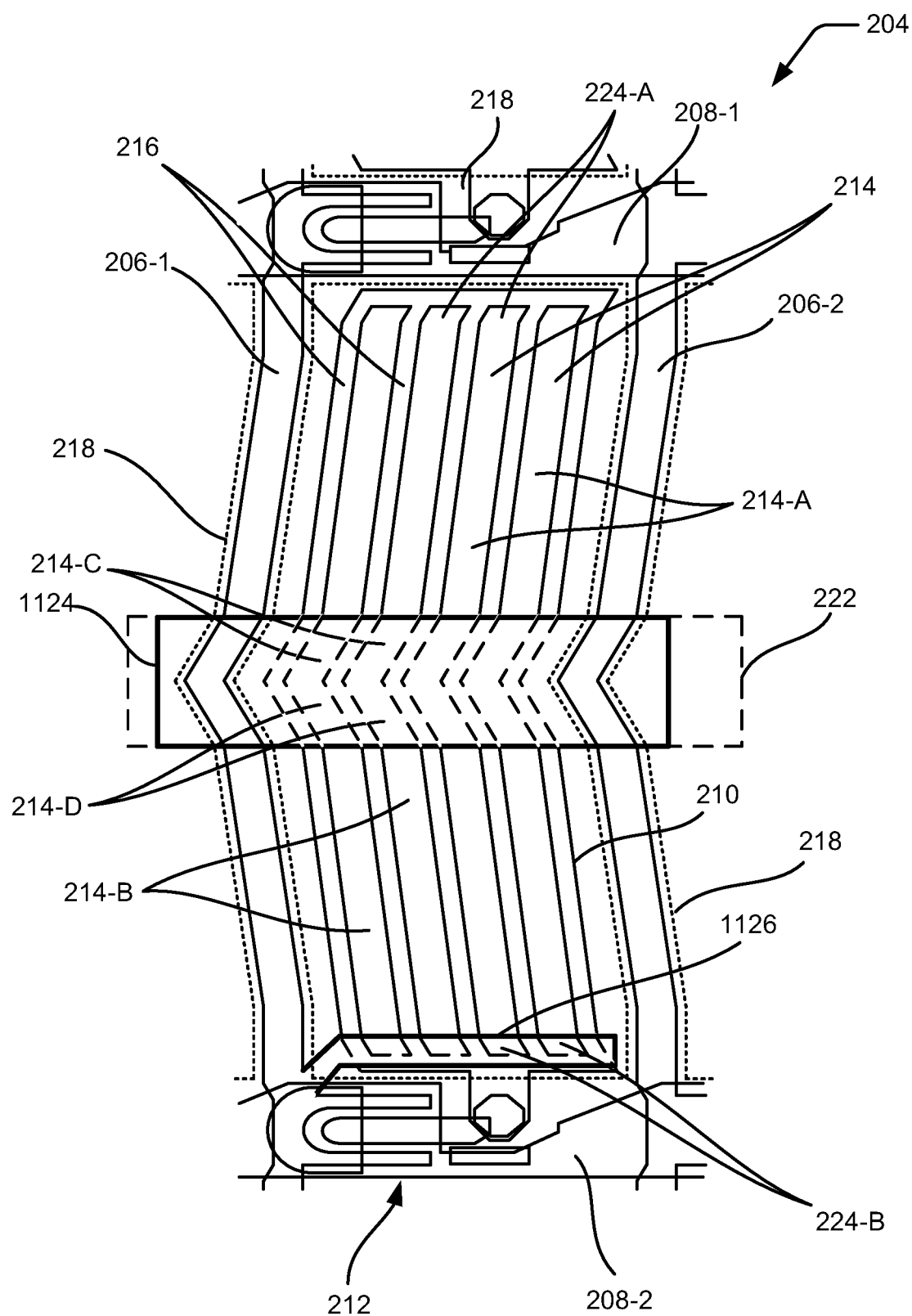
FIG. 12 schematically illustrates a plan view of the pixel of the LCD device with the second light blocking member and a plurality of source lines in a same layer, according to an example implementation of the present subject matter.

FIG. 12 schematically illustrates a plan view of the pixel 204 of the LCD device 100 with the second light blocking member 1126 and the plurality of source lines 206-1 and 206-2 in a same layer, according to an example implementation of the present subject matter. As shown in FIG. 12, the second light blocking member 1126 is electrically connected to the source line 206-1 and is electrically isolated from the source line 206-2. Further, as shown in FIG. 12, the second light blocking member 1126 does not overlap the black matrix 218.

Figure 13:
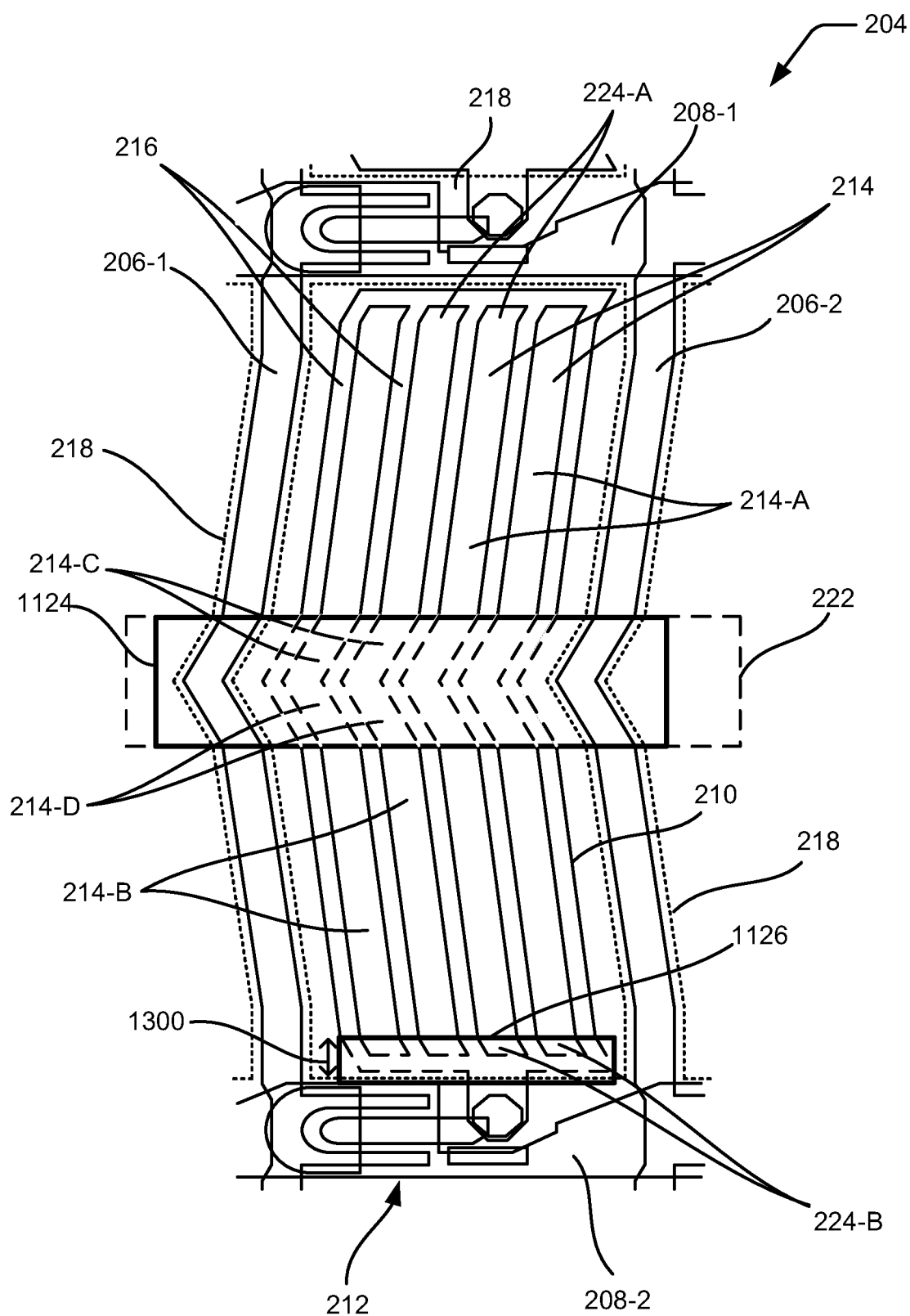
FIG. 13 schematically illustrates a plan view of the pixel of the LCD device with the second light blocking member integrated with a gate line, according to an example implementation of the present subject matter.

In an example implementation, the second light blocking member 1126 and the plurality of gate lines are formed in a same layer and are made of the same metal. The second light blocking member 1126 is integrated with the plurality of gate lines. The black matrix overlaps the gate line. The second light blocking member 1126 extends out from the gate line, such that at least a part of the second light blocking member 1126 is exposed from the black matrix in plan view of the pixel 204. FIG. 13 schematically illustrates a plan view of the pixel 204 of the LCD device 100 with the second light blocking member 1126 integrated with a gate line 208-2, according to an example implementation of the present subject matter. In said example implementation, the second light blocking member 1126 extends out from the gate line 208-2. Further, as shown in FIG. 13, the black matrix 218 overlaps the gate line 208-2. However, a part 1300 of the second light blocking member 1126 is exposed from, and does not overlap, the black matrix 218 in the plan of the pixel 204.

In an example implementation, the pixel 204 may include a light blocking member overlapping the edge portions on one side of the slits 214 or on both sides of the slits 214, without having another light blocking member overlapping the common boundary area 222 of the first set of slit segments and the second set of slit segments. The light blocking member overlapping the edge portions of the slits 214 may be similar to the second light blocking member 1126 as described above with reference to FIGS. 11 to 13.

Figure 14:
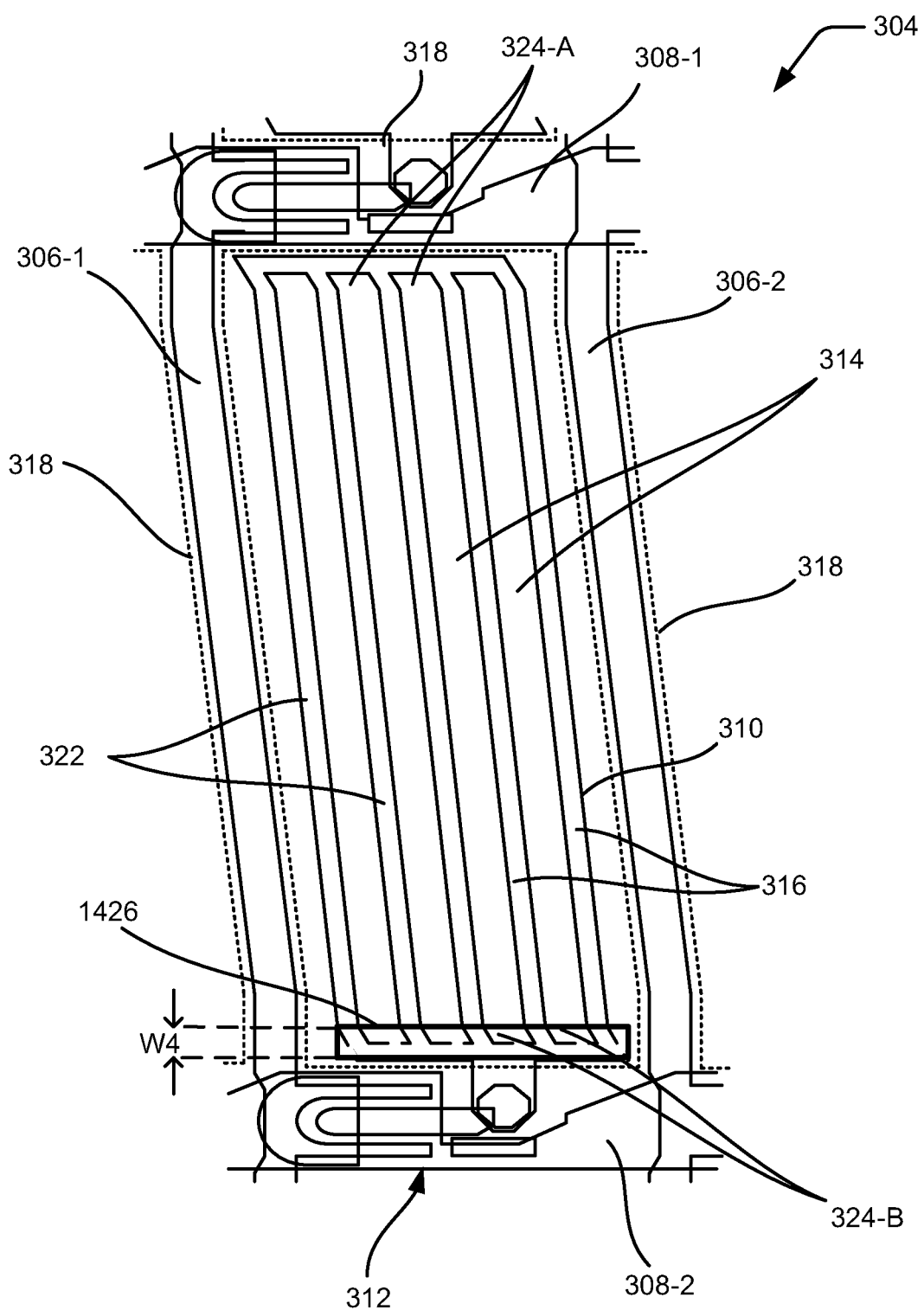
FIG. 14 schematically illustrates a plan view of a pixel of the LCD device with a slit-edge light blocking member, according to an example implementation of the present subject matter.

FIG. 14 schematically illustrates a plan view of the pixel 304 of the LCD device 100 with a slit-edge light blocking member 1426, according to an example implementation of the present subject matter. The pixel 304 may be any of the pixels 104 of the display panel 102 of the LCD device 100.

As shown in FIG. 14, the slit-edge light blocking member 1426 overlaps the edge portion 324-B of each of the slits 314 in plan view of the pixel 304. The slit-edge light blocking member 1426 is made of a metal such that light through a region of the edge portion 324-B of each of the slits 314 is blocked by the slit-edge light blocking member 1426. The metal may include, but is not restricted to, aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti). The slit-edge light blocking member 1426 may also be formed of a stacked layer of aluminum (Al), copper (Cu), molybdenum (Mo), titanium (Ti), or an alloy of tungsten (W) or magnesium (Mg) with aluminum (Al), copper (Cu), molybdenum (Mo), and/or titanium (Ti), or a stacked layer of a combination of the above. In an example implementation, the slit-edge light blocking member 1426 may have a width W4 in a range of about 1 μm to about 10 μm.

Although, FIG. 14 shows the edge portions at one side of the slits 314 being overlapped by a light blocking member, in an example implementation, the pixel 304 may also include another slit-edge light blocking member (not shown in FIG. 14) made of a metal and overlapping the edge portion 324-A of each of the slits 314 in the pixel electrode 310. The other slit-edge light blocking member blocks light through a region of the edge portion 324-A of each of the slits 314. The other slit-edge light blocking member and the slit-edge light blocking member 1426 may be made of the same metal and may have the same width W4.

It may be noted that typically the edge portions of the slits of the pixel electrode of each pixel in the display panel are overlapped by the black matrix. However, when the edge portions of the slits of the pixel electrode are overlapped by a slit-edge light blocking member, in accordance with an example implementation of the present subject matter, the black matrix may not overlap the edge portions. The slit-edge light blocking member, in accordance with the present subject matter, is formed in the second substrate of the display panel, whereas the black matrix is formed in the first substrate. Since the tolerance between the first substrate and the second substrate is high, the slit-edge light blocking member can be made smaller than the black matrix typically overlapping the edge portions. In an alternate example implementation, both the black matrix and the slit-edge light blocking member may overlap the edge portions of the slits.

In an example implementation, the slit-edge light blocking member 1426 and the plurality of common metal lines are formed in a same layer and are made of the same metal. The slit-edge light blocking member 1426 is disposed on, and is electrically connected to, the common electrode of the LCD device 100. Further, in said example implementation, the slit-edge light blocking member 1426 does not overlap the black matrix 318.

In an example implementation, the slit-edge light blocking member 1426 and the plurality of source lines are formed in a same layer. The slit-edge light blocking member 1426 and the plurality of source lines may be made of the same metal. In an example implementation, the slit-edge light blocking member 1426 is electrically connected to one of the two adjacent source lines bounding the pixel 304 and is electrically isolated from the other of the two adjacent source lines bounding the pixel 304. In another example implementation, the slit-edge light blocking member 1426 is electrically isolated from the two adjacent source lines bounding the pixel 304.

Figure 15:
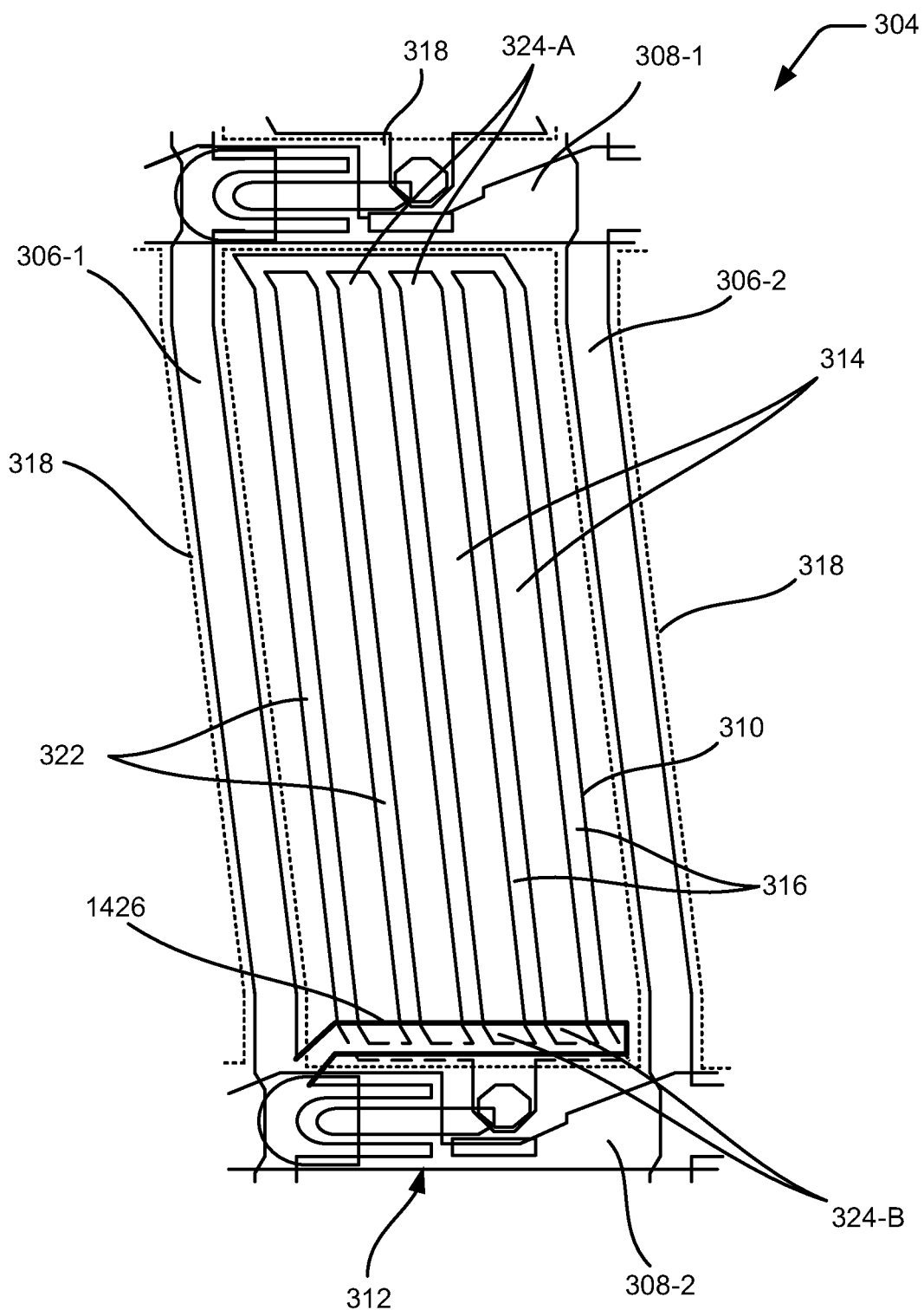
FIG. 15 schematically illustrates a plan view of the pixel of the LCD device with the slit-edge light blocking member and a plurality of source lines in a same layer, according to an example implementation of the present subject matter.

FIG. 15 schematically illustrates a plan view of the pixel 304 of the LCD device 100 with the slit-edge light blocking member 1426 and the plurality of source lines 306-1 and 306-2 in a same layer, according to an example implementation of the present subject matter. As shown in FIG. 15, the slit-edge light blocking member 1426 is electrically connected to the source line 306-1 and is electrically isolated from the source line 306-2. Further, as shown in FIG. 15, the slit-edge light blocking member 1426 does not overlap the black matrix 318.

Figure 16:
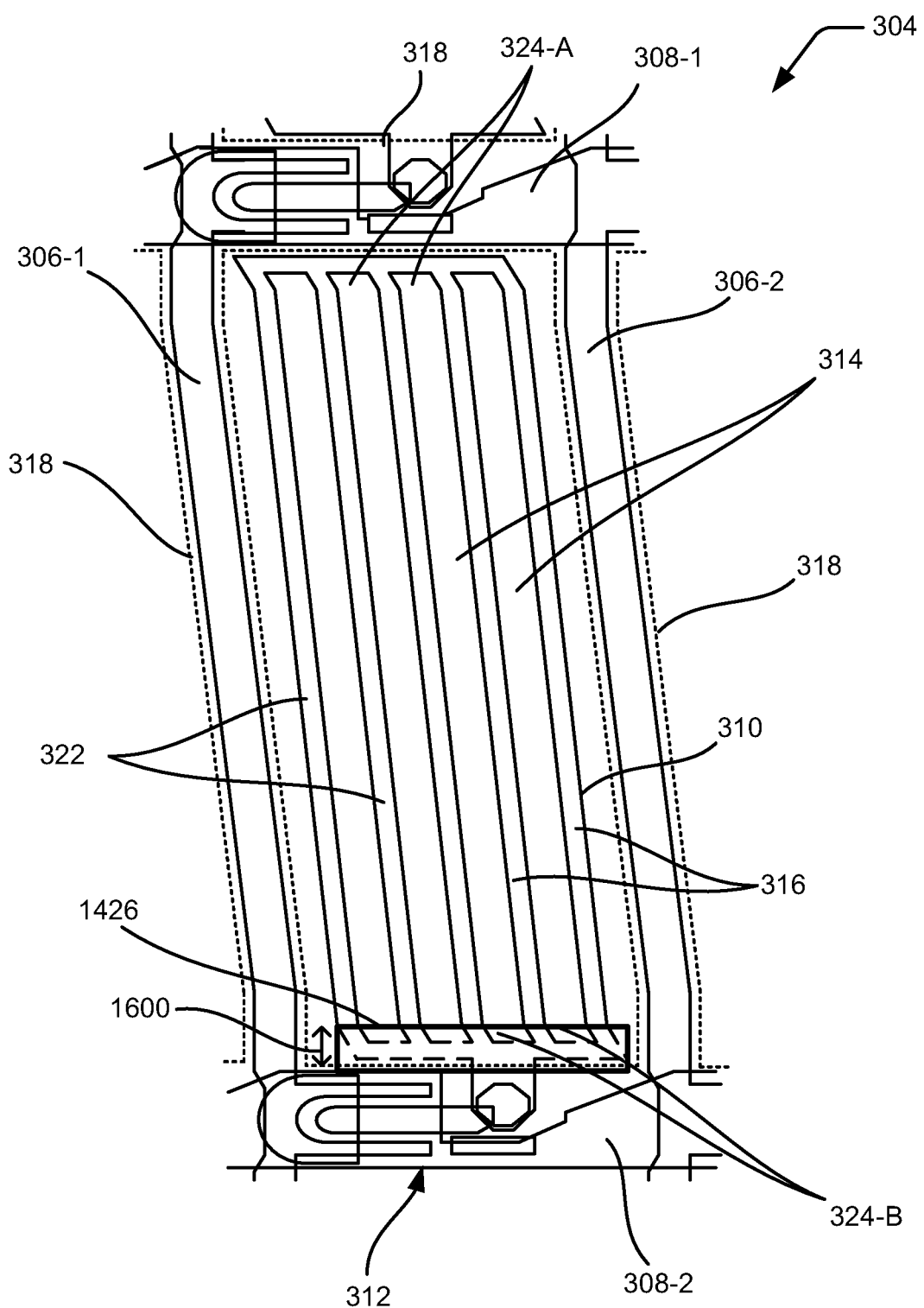
FIG. 16 schematically illustrates a plan view of the pixel of the LCD device with the slit-edge light blocking member integrated with a plurality of gate lines, according to an example implementation of the present subject matter.

In an example implementation, the slit-edge light blocking member 1426 and the plurality of gate lines are formed in a same layer and are made of the same metal. The slit-edge light blocking member 1426 is integrated with the plurality of gate lines. The black matrix overlaps the gate line. The slit-edge light blocking member 1426 extends out from the gate line, such that at least a part of the slit-edge light blocking member 1426 is exposed from the black matrix in plan view of the pixel 304. FIG. 16 schematically illustrates a plan view of the pixel 304 of the LCD device 100 with the slit-edge light blocking member 1426 integrated with a gate line 308-2, according to an example implementation of the present subject matter. In said example implementation, the slit-edge light blocking member 1426 extends out from the gate line 308-2. Further, as shown in FIG. 16, the black matrix 318 overlaps the gate line 308-2. However, a part 1600 of the slit-edge light blocking member 1426 is exposed from, and does not overlap, the black matrix 318 in the plan of the pixel 304.

Although implementations for LCD devices have been described in a language specific to structural features, it is to be understood that the appended claims are not necessarily limited to the specific features described. Rather, the specific features are disclosed as example implementations for the LCD devices.

I claim:

1. A liquid crystal display device comprising: a first substrate including a black matrix; a second substrate opposite to the first substrate; and a liquid crystal layer between the first substrate and the second substrate; wherein the second substrate comprises: a plurality of source lines, a plurality of gate lines crossing the plurality of source lines, and a plurality of pixels in a matrix arrangement, a pixel from the plurality of pixels being defined by two adjacent source lines from the plurality of source lines and two adjacent gate lines from the plurality of gate lines, wherein a pixel electrode formed in the pixel comprises a plurality of slits, the plurality of slits including a first set of slit segments extending in a first direction, and a second set of slit segments extending in a second direction, a first light blocking member for blocking light through the pixel, the first light blocking member extending directly from a first of the two adjacent source lines towards a second of the two adjacent source lines and along a common boundary area of the first set of slit segments and the second set of slit segments, the first light blocking member being spaced apart from the second of the two adjacent source lines in plan-view, and a common electrode opposite to the pixel electrode, wherein the first light blocking member is formed in a different layer than the common electrode and the plurality of gate lines.

2. The liquid crystal display device as claimed in claim 1, wherein the plurality of slits further includes a third set of slit segments extending in a third direction and a fourth set of slit segments extending in a fourth direction, the third set of slit segments and the fourth set of slit segments being formed in the common boundary area.

3. The liquid crystal display device as claimed in claim 2, wherein the first set of slit segments and the second set of slit segments are connected through the third set of slit segments and the fourth set of slit segments.

4. The liquid crystal display device as claimed in claim 2, the first light blocking member entirely overlaps the third set of slit segments and the fourth set of slit segments in plan view.

5. The liquid crystal display device as claimed in claim 1, wherein the second substrate further comprises:
   a plurality of common metal lines electrically connecting to the common electrode, wherein the first light blocking member is a part of the plurality of common metal lines.

6. The liquid crystal display device as claimed in claim 1, wherein the plurality of source lines and the first light blocking member are formed in a same layer.

7. The liquid crystal display device as claimed in claim 6, wherein the first light blocking member is integrated with the first of the two adjacent source lines and is electrically isolated from the second of the two adjacent source lines.

8. The liquid crystal display device as claimed in claim 6, wherein the first light blocking member is electrically isolated from the two adjacent source lines.

9. The liquid crystal display device as claimed in claim 1, wherein the second substrate further comprises a second light blocking member for blocking light through the pixel, the second light blocking member overlapping edge portions of the plurality of slits, and being made of a metal.

10. The liquid crystal display device as claimed in claim 9, wherein the edge portions of the plurality of slits extend in a fifth direction different from the first direction and the second direction.

11. The liquid crystal display device as claimed in claim 9, wherein the second substrate comprises:
   a plurality of common metal lines electrically connecting to the common electrode, wherein the plurality of common metal lines and the second light blocking member are formed in a same layer.

12. The liquid crystal display device as claimed in claim 9, wherein the plurality of source lines and the second light blocking member are formed in a same layer.

13. The liquid crystal display device as claimed in claim 9, wherein the plurality of gate lines is integrated with the second light blocking member.

14. The liquid crystal display device as claimed in claim 13, wherein at least a part of the second light blocking member is exposed from the black matrix in plan view.

15. The liquid crystal display device as claimed in claim 1, wherein the first light blocking member is formed on the common electrode.

16. A liquid crystal display device comprising: a first substrate including a black matrix; a second substrate opposite to the first substrate; and a liquid crystal layer between the first substrate and the second substrate; wherein the second substrate comprises: a plurality of source lines, a plurality of gate lines crossing the plurality of source lines, and a plurality of pixels in a matrix arrangement, a pixel from the plurality of pixels being defined by two adjacent source lines from the plurality of source lines and two adjacent gate lines from the plurality of gate lines, wherein a pixel electrode formed in the pixel comprises a plurality of slits, a slit-edge light blocking member overlapping an edge portion of each of the plurality of slits in plan-view, the slit-edge light blocking member extending directly from a first of the two adjacent source lines towards a second of the two adjacent source lines, the slit-edge light blocking member being spaced apart from the second of the two adjacent source lines in plan-view, and the slit-edge light blocking member being made of a metal, and a common electrode opposite to the pixel electrode, the slit-edge light blocking member being formed in a different layer than the common electrode and the plurality of gate lines.

17. The liquid crystal display device as claimed in claim 16, wherein each of the plurality of slits includes a main portion, the main portion continuously connecting with the edge portion, and wherein the main portion extends in a direction different from an extending direction of the edge portion in each of the plurality of slits.

18. The liquid crystal display device as claimed in claim 16, wherein the second substrate further comprises:
   a plurality of common metal lines electrically connecting to the common electrode, wherein the plurality of common metal lines and the slit-edge light blocking member are formed in a same layer.

19. The liquid crystal display device as claimed in claim 16, wherein the plurality of source lines and the slit-edge light blocking member are formed in a same layer.

20. The liquid crystal display device as claimed in claim 16, wherein the plurality of gate lines and the slit-edge light blocking member are formed in a same layer, and wherein the slit-edge light blocking member is integrated with one of the plurality of gate lines.

21. The liquid crystal display device as claimed in claim 20, wherein at least a part of the slit-edge light blocking member is exposed from the black matrix in plan view.

* * * * *